(12) United States Patent
Tong et al.

(10) Patent No.: US 11,735,038 B2
(45) Date of Patent: Aug. 22, 2023

(54) NON-BLIND AREA REAL-TIME MONITORING AND ALARMING SYSTEM FOR ACCIDENT ON FREEWAY

(71) Applicant: Wuhan University of Technology, Wuhan (CN)

(72) Inventors: Xinglin Tong, Wuhan (CN); Qinyu Wang, Wuhan (CN); Chengwei Deng, Wuhan (CN); Cui Zhang, Wuhan (CN); Yan Mao, Wuhan (CN); Jingchuang Wei, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 0 days.

(21) Appl. No.: 17/745,424

(22) Filed: May 16, 2022

(65) Prior Publication Data

US 2023/0096509 A1    Mar. 30, 2023

(30) Foreign Application Priority Data

Sep. 26, 2021   (CN) .......................... 202111130750.7

(51) Int. Cl.
*G08G 1/01*       (2006.01)
*G08G 1/04*       (2006.01)
*G01H 9/00*       (2006.01)

(52) U.S. Cl.
CPC .......... *G08G 1/0133* (2013.01); *G01H 9/004* (2013.01); *G08G 1/04* (2013.01)

(58) Field of Classification Search
CPC ......... G08G 1/04; G08G 1/0133; G01H 9/004
See application file for complete search history.

(56) References Cited

U.S. PATENT DOCUMENTS

| | | | | |
|---|---|---|---|---|
| 5,051,965 A | * | 9/1991 | Poorman | G01V 1/22 367/149 |
| 5,680,489 A | * | 10/1997 | Kersey | G01M 11/086 385/12 |
| 5,898,517 A | * | 4/1999 | Weis | G02B 6/2931 385/12 |
| 6,049,506 A | * | 4/2000 | White | G01D 5/35303 385/12 |

(Continued)

FOREIGN PATENT DOCUMENTS

CN    113838300 A   * 12/2021

*Primary Examiner* — Hoi C Lau
(74) *Attorney, Agent, or Firm* — Marcus C. Dawes

(57) ABSTRACT

A non-blind area real-time monitoring and alarming system for an accident on a freeway is provided, which belongs to the field of photoelectric technology and can solve the existing problems in whole journey information monitoring for freeways, such as failure to cover all freeway sections and lack of all-weather and prompt monitoring, and being subject to severe environments such as rain, fog and snow, or conditions such as poor visibility at night. The system includes a distributed sound wave detection fiber-optic cable, a sound wave signal demodulator, a network switch, a workstation, and a monitoring terminal. A fiber-optic sensing network composed of a series of reflection nodes distributed at equal distances is utilized to monitor sound wave signals from traffic accidents efficiently in real time without blind areas, accurately locate a traffic incident by analyzing frequency components, and transmit alarming information in time.

8 Claims, 2 Drawing Sheets

(56) References Cited

U.S. PATENT DOCUMENTS

| | | | | |
|---|---|---|---|---|
| 6,137,565 | A * | 10/2000 | Ecke | G01D 5/35335 |
| | | | | 374/E11.016 |
| 10,697,853 | B2 * | 6/2020 | Shang | G01B 9/02041 |
| 2004/0061628 | A1 * | 4/2004 | Hill | G08G 1/02 |
| | | | | 340/933 |
| 2004/0067004 | A1 * | 4/2004 | Hill | G08G 1/04 |
| | | | | 356/478 |
| 2017/0350734 | A1 * | 12/2017 | Ji | G01D 5/35358 |
| 2018/0029619 | A1 * | 2/2018 | Rosenberger | B61L 25/028 |
| 2020/0056959 | A1 * | 2/2020 | Shang | G01B 9/02041 |
| 2021/0013962 | A1 * | 1/2021 | Mansouri Rad | H04B 10/0779 |
| 2021/0241615 | A1 * | 8/2021 | Narisetty | G08G 1/02 |
| 2021/0304578 | A1 * | 9/2021 | Shiina | G01N 21/31 |
| 2022/0032943 | A1 * | 2/2022 | Yoda | E01F 11/00 |
| 2022/0327923 | A1 * | 10/2022 | Tanaka | G08G 1/0137 |
| 2023/0096509 | A1 * | 3/2023 | Tong | G01H 9/004 |
| | | | | 340/933 |

\* cited by examiner

NON-BLIND AREA REAL-TIME MONITORING AND ALARMING SYSTEM FOR ACCIDENT ON FREEWAY

CROSS REFERENCE TO RELATED APPLICATION

This patent application claims the benefit and priority of Chinese Patent Application No. 202111130750.7, filed on Sep. 26, 2021, the disclosure of which is incorporated by reference herein in its entirety as part of the present application.

TECHNICAL FIELD

The present disclosure belongs to the field of photoelectric technology, and in particular, to a non-blind area real-time monitoring and alarming system for an accident on a freeway.

BACKGROUND ART

Freeways are an important infrastructure for the development of modern economy and society and lay an important foundation for traffic modernization. Freeways, as an outstanding modern traffic mode, are representative of speed and efficiency and also one of significant symbols that measure the modernization of the national economy. However, there have been many problems that arise as the traffic mileage of freeways is increasing and the vehicle population grows rapidly. For example, traffic accidents frequently occur on freeways, and casualties and property damage remain stubbornly high. The traffic safety issues have become increasingly prominent. Freeways feature high speeds, closed operation, complex types of vehicles running thereon, etc. As a result, often traffic accidents on freeways cannot be found and handled in time, causing huge casualties and property damage. Such accidents will even produce more serious consequences than urban road traffic accidents. In China, the death rate from traffic accidents on freeways is considerably higher than that from traffic accidents on ordinary highways and has ranked first in the world. Accordingly, one of Chinese social problems to be solved is to improve the traffic safety management for freeways to form effective strategies and measures.

Existing whole journey information monitoring means for freeways mainly include reporting to the police by people involved in accidents, camera surveillance, etc., whereby the location information of traffic accidents can be known. However, such means cannot cover all freeway sections and cannot realize all-weather and prompt monitoring, and also are subject to severe environments such as rain, fog and snow, or conditions such as poor visibility at night. Some other methods that determine the occurrence of an accident by technical means, for example, collecting signals of collisions with road guardrails using white light interferometry modules, vibration sensors, pressure sensors and the like, may be complex in system, high in implementation cost, and difficult to use extensively.

SUMMARY

In view of the existing problems in whole journey information monitoring for freeways, such as failure to cover all freeway sections and lack of all-weather and prompt monitoring, being subject to severe environments such as rain, fog and snow, or conditions such as poor visibility at night, and complex system and high implementation cost, the present disclosure is aimed at providing a non-blind area real-time monitoring and alarming system for an accident on a freeway that can intelligently sense the sound wave of vehicle collision upon occurrence of a traffic accident by means of wavelength and phase demodulation, provide the accurate position and type of the trouble through a local area network coordinating with video and drone patrolling systems and solve the problems of low manual detection efficiency, failure to real-time monitoring, etc.

The present disclosure employs the following technical solutions.

A non-blind area real-time monitoring and alarming system for an accident on a freeway includes a road detection unit, a monitoring signal processing unit, and a locating and patrolling unit that are located in different monitoring areas. The road detection unit includes a distributed sound wave detection fiber-optic cable that is disposed on a freeway guardrail and used for distributed online monitoring of collision sound upon occurrence of a traffic accident. The monitoring signal processing unit includes a fiber-optic sound wave demodulator. The locating and patrolling unit includes a workstation, a monitoring terminal and a drone that coordinate with one another. Data is shared between different monitoring areas by means of a data transmission unit that includes a network switch to form an integrated sensing monitoring network.

An output end of the distributed sound wave detection fiber-optic cable is connected to an input end of the fiber-optic sound wave demodulator, and an output end of the fiber-optic sound wave demodulator is connected to input ends of the monitoring terminal and the workstation.

Further, the distributed sound wave detection fiber-optic cable may include a plurality of reflection nodes distributed on guardrails on two sides of the freeway at equal intervals.

Further, the distributed sound wave detection fiber-optic cable may have detection points distributed at intervals of 10 m.

Further, the fiber-optic sound wave demodulator may be based on the distributed sound wave principle of coherent interferometry.

Further, the monitoring terminal may be based on cloud computing to enable construction of Internet of things of sound wave detection.

Further, the locating may be integrated with a geographic information system (GIS) geographic coordinate calibration technique.

Further, the system may be a fiber-optic sensing technique developed on the basis of optical time domain reflectometry (OTDR) and fiber-optic interferometry.

Further, the fiber-optic sound wave demodulator may include a light source, a pulse modulator, an erbium-doped fiber amplifier, a polarization controller, a fiber Bragg grating (FBG) array, a field programmable gate array (FPGA), a circulator I, a circulator II, a 3×3 coupler, a faraday rotator mirror I, a faraday rotator mirror II, a detector, a high-speed data acquisition card and an upper computer. The FPGA may include a signal generator and a delay module. An output end of the light source may be connected to an input end of the pulse modulator. An output end of the pulse modulator may be connected to an input end of the erbium-doped fiber amplifier. An output end of the erbium-doped fiber amplifier may be connected to an input end of the circulator I through the polarization controller. An output end of the circulator I may be connected to each of input ends of the FBG array and the circulator II. An output end of the circulator II may be connected to an input end of the 3×3 coupler. An output end of the 3×3 coupler may be connected to each of input ends of the faraday rotator mirror I and the faraday rotator mirror II.

An output end of the detector may be connected to an input end of the high-speed data acquisition card. An output end of the high-speed data acquisition card may be connected to an input end of the upper computer. An output end of the upper computer may be connected to an input end of the FPGA.

The monitoring fiber-optic cable may be used to sense changes in external sound wave signals. With a segment of 10 m of the fiber-optic cable as a detection point, a single fiber-optic cable is capable of monitoring a maximum distance of 50 km and is distributed on the guardrails on two sides of the freeway. The capacity of single fiber sensing points is up to thousands of fibers, which is increased by two orders of magnitude compared with the multiplexing capacity of a traditional grating sensor. The shortage of capacity of a traditional wavelength-based strong grating sensor is overcome.

According to the above solutions, the sound wave demodulator may include an ultra-narrow line-width light source, a pulse erbium-doped fiber amplifier (EDFA), and a Raman amplifier, and may be further integrated with optical devices such as an acousto-optic modulator. The sound wave demodulator is high in integration level and small in size. EDFA amplification and Raman amplification are combined to increase the sensing distance of the distributed fiber-optic vibration sensing system. Meanwhile, the signal-to-noise ratio of the sensing system is increased.

According to the above solutions, based on cloud computing, the monitoring terminals are linked together to form the network environment of Internet of things for sound wave detection for traffic troubles on the freeway. In combination with the characteristic of big data, an information management system of cloud computing Internet of things based on big data can be designed. With a "cloud server" as basis, a "mobile Internet" as carrier and a "monitoring terminal" as core, a synthetic platform integrated with functions such as a, and display" of risks is constructed, which can realize visual representation of on-site safety risks.

According to the above solutions, when the patrolling system detects the occurrence of an accident, the monitoring terminal will immediately locate the accident, and a drone will be assigned to the location of the accident and confirm the on-site information. The alarm response time is less than 5 s. The response time of accident handling is greatly reduced.

According to the above solutions, the locating is achieved by making the sound wave sensing fiber-optic cable correspond to the geographic information of the freeway. Based on the GIS geographic coordinate calibration, coordinates of a sensing line are calibrated along the sensing fiber-optic cable of the fiber-optic vibration early-warning system at intervals of 500 m to 1000 m. Calibration points are set at line inflection points, joint stakes, etc. of the sensing fiber-optic cable.

The system uses distributed fiber-optic sound wave sensing and is an advanced fiber-optic sensing technique developed on the basis of optical time domain reflectometry (OTDR) and fiber-optic interferometry. The system has the characteristics of high location accuracy of the OTDR and high sensitivity of the fiber-optic interferometry.

For the complex conditions of a freeway, the system employs an identification and demodulation algorithm for a plurality of mixed sound wave signals and extremely weak interference signals, and a novel data modeling solution is designed. The direction and distance of a sound source can be accurately determined by using a method of time delay of arrival of an optical signal. For locating, the time difference between two sensing points may be calculated depending on the difference in time of arrival. By this method, an accurate vertical distance between the sound source and the sensing optical fiber can be obtained.

The monitoring system for a freeway uses the fiber-optic acoustic sensing network to determine the road operation condition, and uploads the information to the monitoring terminal in real time, thereby realizing full-automatic monitoring.

According to the present disclosure, a fiber-optic sensing network composed of a series of reflection nodes distributed at equal distances is utilized to monitor sound wave signals from traffic accidents efficiently in real time without blind areas, accurately locate a traffic incident by analyzing frequency components, and transmit alarming information in time. The local area network coordinates with the video and drone patrolling systems to provide the accurate position and type of a trouble. Thus, real-time monitoring along a freeway can be realized.

The present disclosure has the following beneficial effects.

The system uses a time division-wave division hybrid multiplexing fiber-optic sound wave detection technique based on linear reflection node sensing array and can accurately locate an accident by collecting a vehicle collision sound frequency along a freeway. A complete organic integrated network is built by combining intelligent human-computer interaction cloud platform data network research with the GIS geographic coordinate calibration technique. The system has the functions of accurate location, ultra-long distance monitoring, and full-time continuous service, and also has the advantages of anti-electromagnetic interference, high adaptive capacity to environment, and good real-time performance. Meanwhile, further determination can be made through coordination with the video system and the drone patrolling system to provide detailed, prompt and accurate information for rescuers. The problems of low efficiency of manual detection, failure to real time monitoring, etc. are solved.

Figure 1:
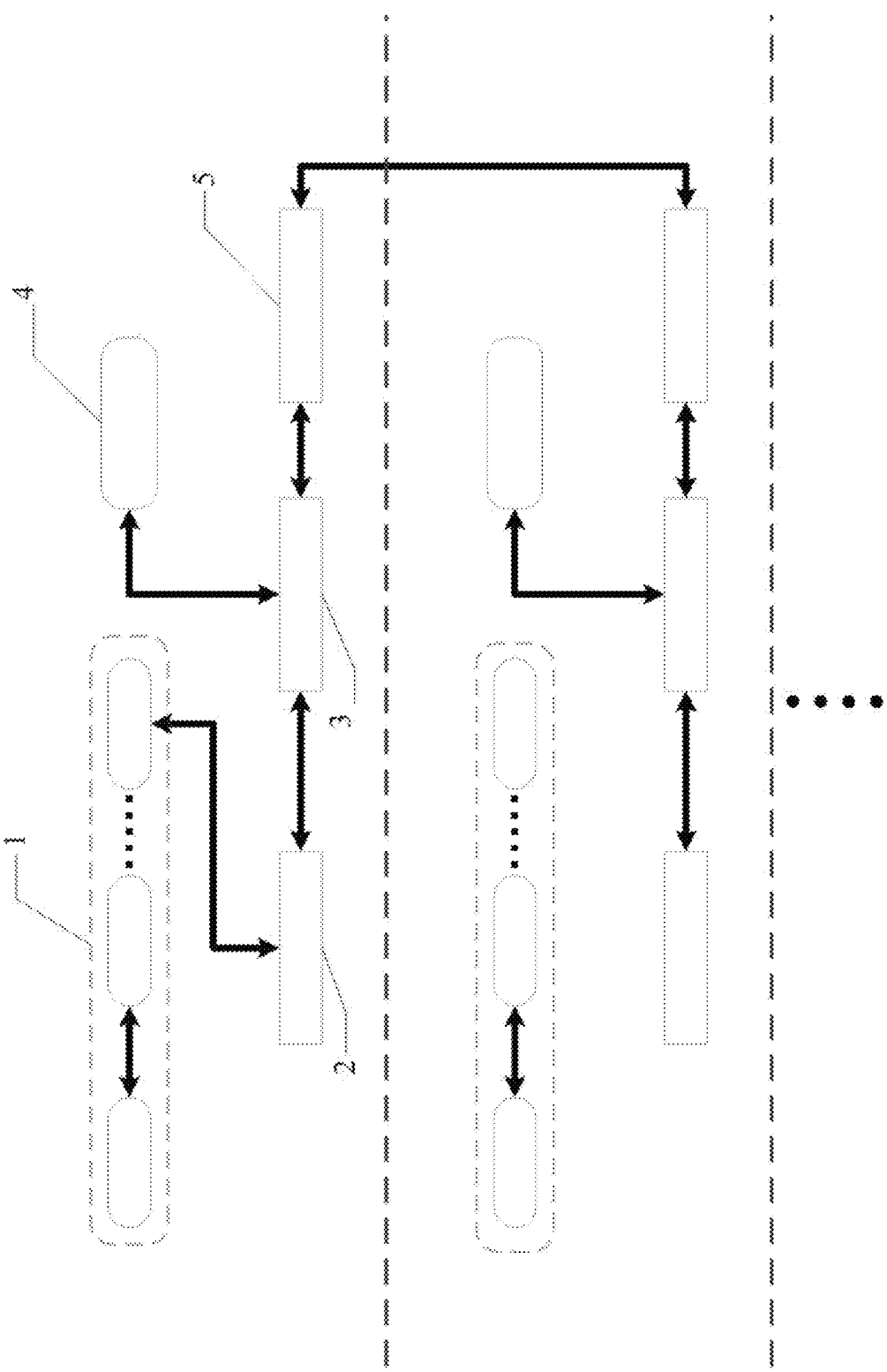
FIG. 1 is a schematic structure diagram of a system according to the present disclosure.

List of Reference Numerals: 1—distributed sound wave detection fiber-optic cable, 2—fiber-optic sound wave demodulator, 3—workstation, 4—monitoring terminal, 5—high-speed network switch, 6—laser light source, 7—pulse modulator, 8—erbium-doped fiber amplifier, 9—polarization controller, 10—FBG array, 11—signal generator, 12—delay module, 13—FPGA, 14—circulator I, 15—circulator II, 16—3×3 coupler, 17—faraday rotator mirror I, 18—faraday rotator mirror II, 19—detector, 20—high-speed data acquisition card, and 21—upper computer.

DETAILED DESCRIPTION OF THE EMBODIMENTS

To make the objective, technical solutions and advantages of the present disclosure clearer, the present disclosure will be further described in detail below with reference to the accompanying drawings and embodiments. It will be appreciated that the specific embodiments described herein are merely intended to explain the present disclosure, rather than to limit the present disclosure. All other embodiments derived from the embodiments of the present disclosure by a person of ordinary skill in the art without creative efforts shall fall within the protection scope of the present disclosure.

The sensor part used in the present disclosure is implemented by a distributed sound wave detection fiber-optic cable, which can be made on line by using an independently developed optical fiber drawing tower.

For a patrolling system, drones are used.

As shown in FIG. 1, an online monitoring system along a freeway includes: a distributed sound wave detection fiber-optic cable 1, a fiber-optic sound wave demodulator 2, a workstation 3, a monitoring terminal 4, and a high-speed network switch 5. The distributed sound wave detection fiber-optic cable is arranged on guardrails on two sides of the freeway. A fiber-optic sound wave sensor composed of a series of reflection nodes distributed at equal intervals transmits a signal to the fiber-optic sound wave demodulator 2 for demodulation. The demodulated information is then transmitted to the workstation 3 and the monitoring terminal 4 for displaying an analysis result. Thus, real-time monitoring of road conditions is achieved. Data is shared between different monitoring areas by the network switch 5 to form an integrated sensing monitoring network. Key parts coordinate with one another through a GIS intelligent human-computer interaction system, a drone patrolling system, a video system and an electronic map system. Management and rescue workers on duty can be informed by means of existing mobile Internet technology.

Figure 2:
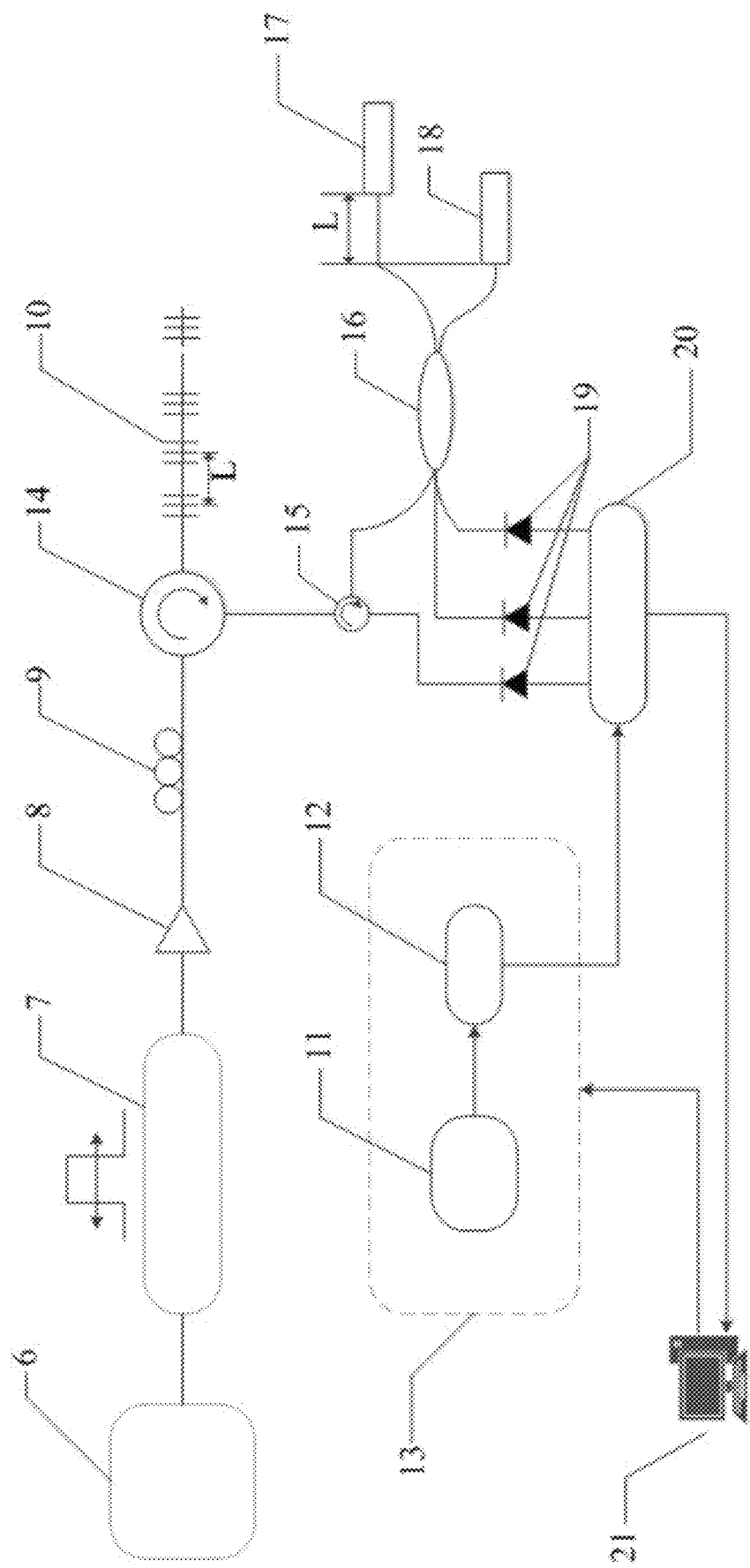
FIG. 2 is a structure diagram of a sound wave demodulator according to the present disclosure.

As shown in FIG. 2, the sound wave demodulator is based on time division multiplexing. An optical fiber between two adjacent reflection nodes in the fiber-optic cable is sensed by means of sound wave as a sensing unit. A difference between two arms of a Michelson interferometer is used to compensate for an optical path difference between two adjacent reflection nodes, such that the light reflected by the two reflection nodes intervenes at a coupler. The change of an interference signal is then detected by a detector, and then an external vibration signal is demodulated. A laser light source 6 is modulated by a pulse modulator 7 such that continuous light is modulated into pulsed light and first amplified. The pulsed light passes through a single EDFA such that the pulsed light signal is amplified secondarily. The amplified light signal enters a tandem FBG array from port 2 of a circulator I. Light is reflected by each reflection node in different time. The reflected light from two adjacent reflection nodes enters a circulator II through port 3 of the circulator, then enters a 3×3 coupler through the circulator II, passes through a long arm and a short arm of the Michelson interferometer, and finally is reflected by faraday rotator mirrors (FRMs) I, II into four beams. When the two arms of the interferometer matches the distance between two adjacent reflection nodes, two chronologically middle beams of light meet and intervene at the coupler. The interference signal is converted into a voltage signal by photoelectric conversion performed by the detector, and the voltage signal is collected by a high-speed acquisition card and uploaded to an upper computer for data processing and displaying. The FPGA part plays a role in generating two pulse signals with corresponding time delays: one pulse signal is used for driving SOA. The other pulse signal is used for triggering the acquisition card to perform collection. The reflection nodes can be detected one by one by controlling the delay time between the two paths of pulses. The collected data is analyzed and processed by data processing software on a server in the workstation to determine whether a traffic accident occurs.

While the embodiments of the present disclosure have been described above with reference to the accompanying drawings, the present disclosure is not limited thereto. The above specific embodiments are merely illustrative and not limiting. Inspired by the present disclosure, those of ordinary skill in the art may also conduct detection on other physical variables without departing from the purposes of the present disclosure and the protection scope defined by the claims, which shall still fall within the protection scope of the present disclosure.

What is claimed is:

1. A non-blind area real-time monitoring and alarming system for an accident on a freeway, comprising:
a road detection unit;
a monitoring signal processing unit; and
a locating and patrolling unit that are located in different monitoring areas,
wherein the road detection unit comprises a distributed sound wave detection fiber-optic cable that is disposed on a freeway guardrail and used for distributed online monitoring of collision sound upon occurrence of a traffic accident;
wherein the monitoring signal processing unit comprises a fiber-optic sound wave demodulator;
wherein the locating and patrolling unit comprises a workstation, a monitoring terminal and a drone that coordinate with one another;
wherein data is shared between different monitoring areas by means of a data transmission unit that comprises a network switch to form an integrated sensing monitoring network, and
wherein an output end of the distributed sound wave detection fiber-optic cable is connected to an input end of the fiber-optic sound wave demodulator, and
wherein an output end of the fiber-optic sound wave demodulator is connected to input ends of the monitoring terminal and the workstation.

2. The non-blind area real-time monitoring and alarming system for an accident on a freeway according to claim 1, wherein the distributed sound wave detection fiber-optic cable comprises a plurality of reflection nodes distributed on guardrails on two sides of the freeway at equal intervals.

3. The non-blind area real-time monitoring and alarming system for an accident on a freeway according to claim 1, wherein the distributed sound wave detection fiber-optic cable has detection points distributed at intervals of 10 m.

4. The non-blind area real-time monitoring and alarming system for an accident on a freeway according to claim 1, wherein the fiber-optic sound wave demodulator is based on the distributed sound wave principle of coherent interferometry.

5. The non-blind area real-time monitoring and alarming system for an accident on a freeway according to claim 1, wherein the monitoring terminal is based on cloud computing to enable construction of Internet of things of sound wave detection.

6. The non-blind area real-time monitoring and alarming system for an accident on a freeway according to claim 1, wherein the locating is integrated with a geographic information system (GIS) geographic coordinate calibration technique.

7. The non-blind area real-time monitoring and alarming system for an accident on a freeway according to claim 1, wherein the system is a fiber-optic sensing technique developed on the basis of optical time domain reflectometry and fiber-optic interferometry.

8. The non-blind area real-time monitoring and alarming system for an accident on a freeway according to claim 1, wherein the fiber-optic sound wave demodulator comprises:
- a light source;
- a pulse modulator;
- an erbium-doped fiber amplifier;
- a polarization controller;
- a fiber Bragg grating (FBG) array;
- a field programmable gate array (FPGA);
- a circulator I;
- a circulator II;
- a 3×3 coupler;
- a faraday rotator mirror I;
- a faraday rotator mirror II;
- a detector;
- a high-speed data acquisition card; and
- an upper computer, wherein the FPGA comprises a signal generator and a delay module, wherein an output end of the light source is connected to an input end of the pulse modulator, wherein an output end of the pulse modulator is connected to an input end of the erbium-doped fiber amplifier, wherein an output end of the erbium-doped fiber amplifier is connected to an input end of the circulator I through the polarization controller, wherein an output end of the circulator I is connected to each of input ends of the FBG array and the circulator II;

wherein an output end of the circulator II is connected to an input end of the 3×3 coupler, wherein an output end of the 3×3 coupler is connected to each of input ends of the faraday rotator mirror I and the faraday rotator mirror II, wherein an output end of the detector is connected to an input end of the high-speed data acquisition card, wherein an output end of the high-speed data acquisition card is connected to an input end of the upper computer, and wherein an output end of the upper computer is connected to an input end of the FPGA.

* * * * *